US010316572B2

(12) United States Patent
Leitmann et al.

(10) Patent No.: US 10,316,572 B2
(45) Date of Patent: Jun. 11, 2019

(54) TELESCOPIC MECHANISM FOR OPENING/CLOSING SLIDING DOORS

(71) Applicant: VISION BOX—SOLUÇÕES DE VISÃO POR COMPUTADOR S.A., Oeiras (PT)

(72) Inventors: Miguel Leitmann, Oeiras (PT); Bento Correia, Oeiras (PT)

(73) Assignee: VISION BOX—SOLUÇÕES DE VISÃO POR COMPUTADOR S.A., Oeiras (PT)

( * ) Notice: Subject to any disclaimer, the term of this patent is extended or adjusted under 35 U.S.C. 154(b) by 0 days.

(21) Appl. No.: 15/033,792

(22) PCT Filed: Oct. 31, 2014

(86) PCT No.: PCT/PT2014/000065
§ 371 (c)(1),
(2) Date: May 2, 2016

(87) PCT Pub. No.: WO2015/076686
PCT Pub. Date: May 28, 2015

(65) Prior Publication Data

US 2016/0281412 A1 Sep. 29, 2016

(30) Foreign Application Priority Data

Oct. 31, 2013 (PT) ........................................ 107266

(51) Int. Cl.
*E05F 11/00* (2006.01)
*E05F 17/00* (2006.01)
(Continued)

(52) U.S. Cl.
CPC ............ *E05F 17/00* (2013.01); *E05F 15/643* (2015.01); *E06B 3/921* (2013.01); *E05F 2017/005* (2013.01); *E05Y 2800/122* (2013.01)

(58) Field of Classification Search
CPC ... E05F 2017/005; E05F 17/00; E05F 15/643; E06B 3/921; E05Y 2800/122
(Continued)

(56) References Cited

U.S. PATENT DOCUMENTS 704,887 A * 7/1902 Low ........................ E05F 17/00 160/181
1,960,860 A * 5/1934 Allen ...................... E05F 17/00 160/188
(Continued)

FOREIGN PATENT DOCUMENTS

EP 2129854 B1 * 12/2014 ......... E05D 15/0617
KR 101182413 B1 * 9/2012 ............ E05F 17/002
(Continued)

*Primary Examiner* — Jerry E Redman
(74) *Attorney, Agent, or Firm* — The Roy Gross Law Firm, LLC; Roy Gross

(57) ABSTRACT

A telescopic mechanism and corresponding method for opening and closing sliding doors which allows obtaining a dimensional gain equal to the diameter of the pulleys including an intelligent control board, a motor, a system of pulley and belt linear guides which connect the panel A to Panel B, a lever system, arms, rotary union, shaft of rotation, which originate movements of extension and compression of a sliding structure comprising a chassis, Panel A and Panel B. The belt and pulley system includes a belt, a brake, wheels movable pulleys fixed to the chassis and static pulleys.

6 Claims, 3 Drawing Sheets

(51) Int. Cl.
*E05F 15/643* (2015.01)
*E06B 3/92* (2006.01)

(58) Field of Classification Search
USPC .......... 49/360; 160/136, 137, 138, 139, 150, 160/151, 218, 222, 223, 202
See application file for complete search history.

(56) References Cited

U.S. PATENT DOCUMENTS 2,841,390 A * 7/1958 Urquhart ................. B63B 19/18 49/102
3,100,916 A * 8/1963 McKinney .......... E05D 15/0656 49/125
4,947,964 A * 8/1990 Husmann ................ B66B 13/12 187/314
8,763,327 B2 * 7/2014 Harter ....................... E04B 2/74 160/222
2002/0157317 A1 * 10/2002 Valencia ............... E05F 15/643 49/360
2005/0045638 A1 * 3/2005 Maki .................. B23Q 11/0825 220/279
2009/0307980 A1 * 12/2009 Hemmings ............... B61B 1/02 49/360
2011/0147132 A1 * 6/2011 Spiess ..................... B66B 13/08 187/340
2011/0155513 A1 * 6/2011 Spiess ..................... B66B 13/12 187/340
2012/0192490 A1 * 8/2012 McCaslin ........... H04L 12/2827 49/31
2012/0192493 A1 * 8/2012 Wolfe ................. E05B 47/0046 49/449
2013/0333983 A1 * 12/2013 Zappa ..................... B66B 13/08 187/331
2016/0114660 A1 * 4/2016 Wang ....................... B60J 5/062 49/127

FOREIGN PATENT DOCUMENTS

WO WO-2012010697 A1 * 1/2012 ......... E05B 65/0864
WO WO-2015076686 A1 * 5/2015 .............. E05F 17/00

* cited by examiner

Recolhido

½ percuso

Estendido

TELESCOPIC MECHANISM FOR OPENING/CLOSING SLIDING DOORS

TECHNICAL FIELD

Currently, the mechanisms for opening/closing sliding doors have as a main component a pulley system that allows the opening and closing of the sliding doors.

The sliding doors can be used in several places to allow access, particularly in buildings, transport and airports.

Upon installation of the access mechanism, one of the determining factors is away from the opening of the doors, as if it is smaller it is possible to install more access mechanisms side by side. Thus, any improvement technique to cut down the distance of door opening will bring a substantial efficiency advantage, increasing the number of access mechanisms, thereby undermining the waiting time of users wishing to access a particular location (that is, a building a transport, an airport, etc.).

BACKGROUND

The following references establish the state of the art:

US Patent No. CN202832049U, Lu Shanxing required by the Sep. 20, 2012 and Mar. 27, 2013 granted, is a major feature of the use of a pulley system that allows opening a sliding window.

Patent No. EP0382435, required by Rotalac Plastica, requested and granted on Jun. 2, 1989 to Aug. 25, 1993 (already expired), which also uses a pulley system for opening a system of shutters.

In the current state of the art there is no combined pulley system with a telescopic arm with an associated electric motor. Existing systems rely solely on a system of pulleys.

SUMMARY

The present specification relates to a telescopic mechanism used in conjunction with an electric motor and system of gears to allow compression and extension movements of a sliding structure, consisting of a plurality of panels that could overlap on each other, by a system of pulley and belt so as to configure a gateway.

In addition to the engine, the intent is to also patent the method of operation. It is thus faced with a patent for a method of organization and functioning of the entity.

The present specification has as its main components that allow the passage of movement (opening and closing of the sliding door) via a chassis for Panel A and Panel B: intelligent control board, a motor, a belt and pulley system, linear guides system, lever arms, joints and rotary axis of rotation.

The pulley and belt system comprises a belt brake, movable wheels, pulleys fixed to the chassis and static pulleys.

A major advantage of the apparatus of the present specification is that the mechanism is ready to be used as a component of an automated door, and adapt to space available for placement of access ports.

Actually the points of access control are designed to allow the passage of as many people as possible within the constraints of space imposed by the building. Thus, in order to be efficient and provide a high yield, the use of space must be optimized to accommodate the largest possible number of access ports.

The critical dimension determines the overall width of the port is the length of their mechanisms of doors, when fully retracted.

The structures of doors commonly called "slim" have a limited internal space for extensible components.

In this case, the objective is to maintain the width of the largest part of the structure between each passage of people, while allowing an increase in the immediate proximity of each of the gate mechanisms placed side by side. As previously mentioned, the space available for installing the door mechanism is very limited space and cannot interfere with the other components of the structure while performing a fast and controlled extension or compression movements of opening and closing the door.

When in the extended position, the doors resist forces in any direction and at any point the application with minimal bending or pressure.

Thus, in order to overcome space limitations the present specification uses an electric motor which transforms the rotary motion into linear motion through combination of a belt and pulley, enabling telescopic panels are designed to slide into another.

This mechanism can be applied to different types of integrated mechanisms in any device requiring an extendable and/or folding movement.

In short, the mechanism incorporates an electric motor connected to a fixed structure; it rotates a pulley, which in turn engages a toothed belt which passes over a set of pulleys configured to transmit a linear movement to the first sliding panel. The result of the opening and closing movement of the door is equal to the distance between the static pulleys, this being one of the main advantages of this system. In the current state of the art, existing solutions result of the opening and closing movement of the door is always less than the distance between the inner ends of the crossing point due to the movement limiting opening and closing the door.

It is important to remember that the workflow is as follows:

The motor rotates the pulley fixed panel belt.

The moving belt is leveraged over a pulley which causes the sliding panel extending in a controlled manner, both in terms of speed and acceleration.

As the panel extends, the lever forces the sliding panel which is nested inside the panel to extend a telescoping.

When both panels are fully extended into the passage, the system is in its closed position.

The reversal of the direction of motor rotation reverses the above process and causes the system to open, freeing the passage and retract completely into the door frame.

BRIEF DESCRIPTION OF THE DRAWINGS

For a better perception of the apparatus will appeal the following figures.

DETAILED DESCRIPTION

Figure 1:
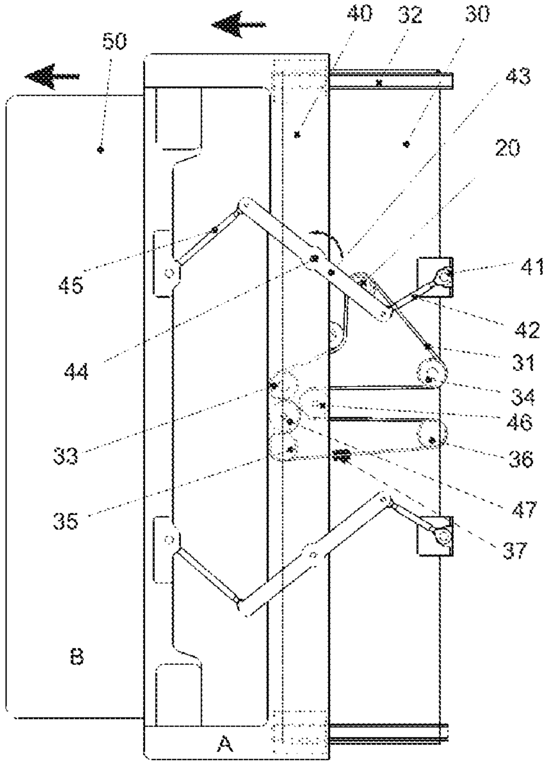
FIG. 1 depicts the general view of the apparatus and its components in accordance with one or more embodiments of the current specification.
Figure 2:
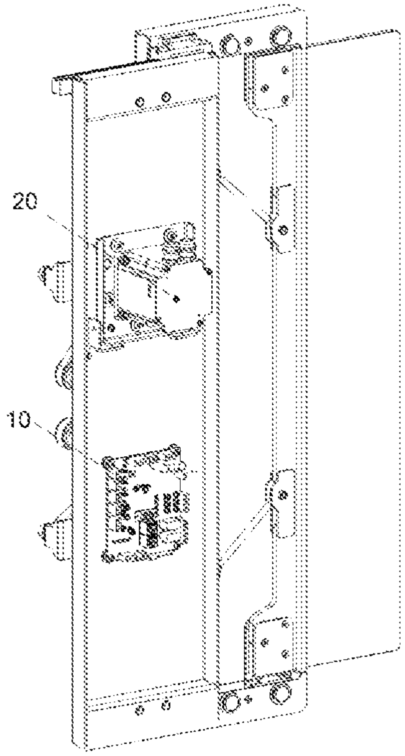
FIG. 2 depicts an internal view of the apparatus it is possible to identify the motor and the intelligent control board in accordance with one or more embodiments of the current specification.

This time, using the labeled pictures will proceed to the detailed description.

The present specification, as mentioned above, discloses a telescopic mechanism used in conjunction with an electric motor and system of gears to allow compression and extension movements of a sliding structure, consisting of a plurality of panels that could overlap on each other through a belt and pulley system so as to configure a gateway.

The door comprises an intelligent control board (10) which receives commands for opening and closing the door by applying telescoping control.

Subsequently drives the motor (20) to rotate in order to linearly move the belt (31). The belt (31) has the ends fixed to the brake (37) which is integral with the chassis (30) and causes the movement of the wheels (46) and (47) are united and fixed to the panel A (40), which is movable, which is fixed to a system of linear guides (32). These wheels (46; 47) are rotated by the belt (31) and the course is maximized to the external dimension of the entire system. Static pulleys (35, 36) do not rotate due to the belt (31) because it is fixed to the chassis (30).

Simultaneously, the panel A (40) is integral with Panel B (50) via a lever system (43) and arms (42; 45) establishing a relationship of movement. Panel A (40) to extend, moves the axis of rotation (44) of the lever (43) and transmits this movement to the panel B (50) through the arms (42, 44) supported in rotary union (41). The Panel A (40) is connected to Panel B (50) via linear guides (32).

The motion transmission system implemented in this solution allows to maximize the travel due to the vertical offset of the wheels (46; 47) and relative to the pulleys (33; 34) are in the chassis (30) fixed. This detail provides the system with an efficiency greater than other systems since it maximizes the movement of the Panel A (40) with respect to Panel B (50) with a dimensional gain similar to the diameter of the pulleys (33; 34). Being a telescoping, this gain is doubled and gives the engine an efficiency that is distinguished from all existing products in a market where size is a factor in the decision maker equipment to be selected.

Figure 3:
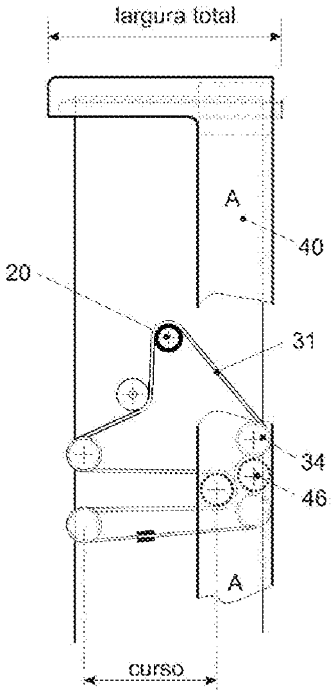
FIG. 3 depicts a detailed view of the telescopic mechanism in the retracted position in accordance with one or more embodiments of the current specification.
Figure 4:
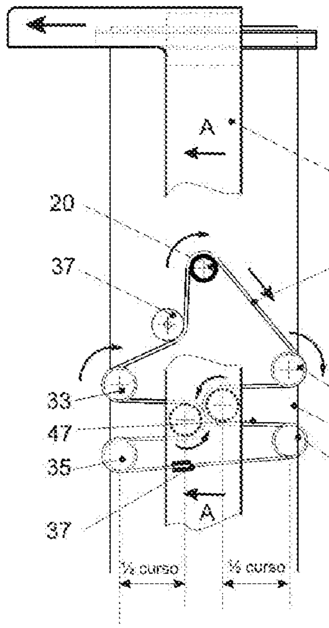
FIG. 4 depicts a detailed view of the telescopic mechanism halfway through in accordance with one or more embodiments of the current specification.
Figure 5:
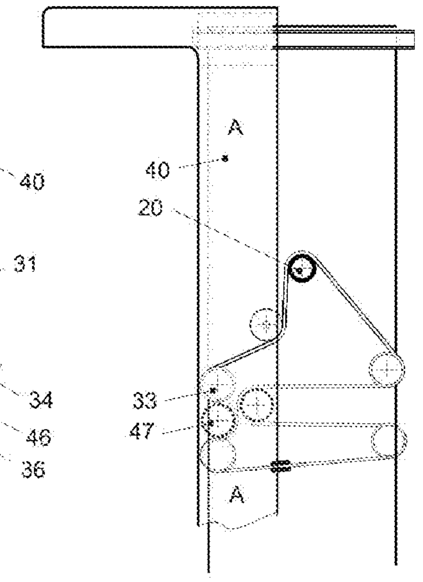
FIG. 5 depicts a detailed view of the telescopic mechanism in the extended position in accordance with one or more embodiments of the current specification.

Detail passage movement of the chassis (30) for Panel A (40):

FIGS. 3 to 5 illustrate three states in order to visualize the motion sequence, they are collected, mid-term and extended.

In the retracted position the panel (40) is in the initial position, which is reached when the pulley (34) and the wheel (46) have their centers coincide in the vertical plane.

In the middle of the route position when the motor (20) is rotating through its pulley transmit movement to the belt (31) which is secured to the brake (37). This movement of the motor (20) pulley exerts a traction force on the belt (31) which in turn pulls the wheel (47) which is attached to Panel A (40). The wheel (46) which is located on the same Panel A (40) wheel and then receives the coming belt (31) pulley of the motor (20).

The belt (31) is in a closed and bounded peripherally by pulleys (33; 34; 35; 36), the wheels (46; 47), the brake (37) and the motor pulley (20) by rotating causes a linear movement in Panel A (40).

In the extended position Panel A (40) is the final position of the course. The final position is achieved when the pulley (33) and the wheel (47) have their centers coincide in the vertical plane.

What is claimed is:

1. A telescopic mechanism for opening and closing of doors comprising:

- an intelligent control board configured to receive commands;
- a belt and a pulley system comprising a belt, a brake, wheels movable pulleys fixed to a chassis and to static pulleys;
- an electric motor controlled by the intelligent control board, the electric motor configured to drive the belt and pulley system;
- a first panel and a second panel, the first panel and the second panel connected via linear guides that are configured to allow the first panel and the second panel to slide along an axis; and
- a lever system having arms that synchronize the movement of the first panel and the second panel, the lever system configured to move along an axis of rotation;
- wherein the arms of the lever system originate movements of extension and compression of a sliding structure comprising the first panel and the second panel.

2. The telescopic mechanism of claim 1, wherein the electric motor turns rotary motion into linear motion through the pulleys, the static pulleys, the belt and the first panel.

3. The telescopic mechanism of claim 1, wherein the belt has ends fixed to the brake which are integral with the chassis and cause movement of the wheels to be united and fixed to the first panel which is mobile and is fixed to the linear guides;

- wherein the wheels are rotated by the belt, and
- wherein the static pulleys do not rotate by the belt and are fixed to the chassis.

4. The telescopic mechanism of claim 1 wherein the first panel and is connected to the second panel via the lever system and the arms.

5. The telescopic mechanism of claim 1, wherein the first panel when extending moves the axis of rotation of the lever and transmits this motion to the second panel through the arms supported in rotary union.

6. The telescopic mechanism of for opening and closing doom according to claim 1, wherein the movement of the first panel with respect to the second panel is equal to the distance between the static pulleys, whereby a dimensional gain equal to a diameter of the static pulleys is achieved by the movement of opening and closing of the first panel with respect to the second panel.

* * * * *